(12) United States Patent
Fujita

(10) Patent No.: US 8,085,012 B2
(45) Date of Patent: Dec. 27, 2011

(54) SEMICONDUCTOR INTEGRATED CIRCUIT AND SENSOR DRIVING/MEASURING SYSTEM

(75) Inventor: Mitsutoshi Fujita, Kyoto (JP)

(73) Assignee: Panasonic Corporation, Osaka (JP)

( * ) Notice: Subject to any disclaimer, the term of this patent is extended or adjusted under 35 U.S.C. 154(b) by 737 days.

(21) Appl. No.: 12/133,911

(22) Filed: Jun. 5, 2008

(65) Prior Publication Data
US 2009/0021226 A1    Jan. 22, 2009

(30) Foreign Application Priority Data
Jul. 19, 2007 (JP) .................... 2007-188012

(51) Int. Cl.
*G05F 1/00* (2006.01)
(52) U.S. Cl. ..................... 323/266; 323/270
(58) Field of Classification Search .............. 323/266, 323/270
See application file for complete search history.

(56) References Cited

U.S. PATENT DOCUMENTS

| | | | |
|---|---|---|---|
| 4,395,658 A * | 7/1983 | Okino ............................ 315/134 |
| 4,625,151 A * | 11/1986 | Kataoka ..................... 315/241 P |
| 4,797,907 A | 1/1989 | Anderton |
| 5,821,697 A | 10/1998 | Weber |
| 6,498,901 B2 * | 12/2002 | Kawasaki et al. ............. 396/157 |
| 7,241,266 B2 | 7/2007 | Zhou et al. |
| 7,382,113 B2 * | 6/2008 | Wai et al. ...................... 323/266 |
| 2004/0152999 A1 | 8/2004 | Cohen et al. |
| 2006/0113960 A1 | 6/2006 | Thulesius et al. |

FOREIGN PATENT DOCUMENTS

| | | |
|---|---|---|
| JP | 2003-179492 | 6/2003 |
| JP | 2005-044203 | 2/2005 |

* cited by examiner

*Primary Examiner* — Jue Zhang
(74) *Attorney, Agent, or Firm* — McDermott Will & Emery LLP

(57) ABSTRACT

In a sensor driving/measuring system, specifications required by a sensor which requires a high applied voltage are implemented with const increase suppressed. A semiconductor integrated circuit for use in a sensor driving/measuring system driven by a battery includes: a sensor driver for outputting a given voltage to be applied to a sensor; a measuring circuit for receiving and measuring a voltage obtained, through current-voltage conversion, from a current generated in the sensor; and a booster. The booster boosts a given pre-boost voltage to obtain a boosted voltage and supplies the boosted voltage as a power supply voltage to the sensor driver and the measuring circuit.

6 Claims, 4 Drawing Sheets

SEMICONDUCTOR INTEGRATED CIRCUIT AND SENSOR DRIVING/MEASURING SYSTEM

CROSS-REFERENCE TO RELATED APPLICATION

The disclosure of Japanese Patent Application No. 2007-188012 filed in Japan on Jul. 19, 2007 including specification, drawings and claims is incorporated herein by reference in its entirety.

BACKGROUND OF THE INVENTION (1) Field of the Invention

The present invention relates a sensor driving/measuring system for driving a sensor and measuring an output of the sensor.

(2) Disclosure of Related Art

Conventional sensor driving/measuring systems are generally equipped with semiconductor integrated circuits for driving and measuring sensors.

It is necessary to supply stable power supply voltages to A/D converters that convert analog signals, such as sensor outputs, into digital signals and process the resultant signals. The voltage ranges of measurable signals are limited by the power supply voltages of the A/D converters. Specifically, a high signal voltage which is to be measured requires a high power supply voltage.

In battery-driven equipment, the electromotive forces of batteries differ between new batteries and batteries in which only small amounts of charge remain. To extend the operation time of the equipment, stable operation even at power supply voltages of such batteries with small amounts of remaining charge is demanded.

To meet this demand, a conventional sensor driving/measuring system driven by batteries and using a semiconductor integrated circuit has a configuration as illustrated in FIG. 4. or 5. The configuration illustrated in FIG. 4 employs a semiconductor integrated circuit 402 that has a high breakdown voltage, is used for driving/measuring a sensor, and is operable in a wide power-supply-voltage range from the voltage of a new battery to the electromotive force of a battery with a small amount of remaining charge. It should be noted that batteries 404 need to have at least an electromotive force enough to allow the semiconductor integrated circuit 402 to apply, to a sensor 403, a voltage required by the sensor 403. In the configuration illustrated in FIG. 5, a semiconductor integrated circuit 502 with an ordinary breakdown voltage is connected to batteries 504 through a regulator IC 508 that generates a stable voltage in a wide power-supply-voltage range from the voltage of a new battery to the electromotive force of a battery with a small amount of remaining charge. It should be noted that the batteries 504 need to have at least an electromotive force enough to allow the semiconductor integrated circuit 502 to apply, to a sensor 503, a voltage required by the sensor 503.

In the structures of the battery-driven sensor driving/measuring systems illustrated in FIGS. 4 and 5, the power supply voltages need to be monitored and managed so that the amounts of charge remaining in the batteries 404 and 504 are determined. The configuration illustrated in FIG. 5 also needs external parts, such as a switch 509 for stopping the flow of current when no power supply voltage is detected and a voltage dividing resistance 510, in order to prevent the power supply voltage from being directly applied to the semiconductor integrated circuit 502 and to suppress unnecessary current consumption.

In the field of A/D converters, the technique of switching from a power supply voltage to an A/D converter to a boosted voltage when the power supply voltage is low is known, for example (see, for example, Patent Document 1).

In the field of boosters, the technique of switching an output current of a regulator serving as a load of the booster to prevent a drop of a boosted voltage is known, for example (see, for example, Patent Document 2).

(Patent Document 1)
Japanese Unexamined Patent Publication No. 2003-179492

(Patent Document 2)
Japanese Unexamined Patent Publication No. 2005-44203

For semiconductor integrated circuits, voltages at which the circuits normally operate and voltages at which breakdown of the circuits does not occur are generally determined according to fabrication processes. As the upper limits of these voltages become higher, the cost increases. Specifically, the fabrication process becomes more complicated and the size of each element increases, for example.

On the other hand, for sensor driving/measuring systems, voltages applied to drive sensors and voltages at points where sensor current to be measured is detected are determined according to characteristics and configurations of the sensors in most cases. In other words, such voltage specifications are not determined to suit the convenience of the sensor driving/measuring systems and, therefore, sensor driving/measuring systems including semiconductor integrated circuits are often designed according to sensor characteristics.

When a voltage applied to a sensor is high, the power supply voltage needs to be high. Accordingly, for example, the following measures are taken: a sensor driving/measuring semiconductor integrated circuit having a higher breakdown voltage is designed by increasing the number of incorporated batteries or by using batteries having higher electromotive forces; and a sensor driving/measuring semiconductor integrated circuit is used together with a regulator IC which absorbs variations in the power supply voltage. In either case, increase of the cost is inevitable in current situations.

SUMMARY OF THE INVENTION

An object of the present invention is to implement specifications required by a sensor which needs a high applied voltage with cost increase suppressed in a sensor driving/measuring system.

According to the present invention, a semiconductor integrated circuit for use in a sensor driving/measuring system driven by a battery includes: a sensor driver for outputting a given voltage to be applied to a sensor; a measuring circuit for receiving and measuring a voltage obtained, through current-voltage conversion, from a current generated in the sensor; and a booster for boosting a given pre-boost voltage to obtain a boosted voltage and for supplying the boosted voltage as a power supply voltage to the sensor driver and the measuring circuit.

In this semiconductor integrated circuit, the sensor driver for outputting an applied voltage to the sensor operates at the boosted voltage generated by the booster. This allows a high voltage to be applied to the sensor even when the power supply voltage of the battery is low. In addition, the measuring circuit for measuring a voltage generated at the sensor and obtained through I-V conversion also operates at the boosted voltage generated by the booster. This enables A/D conversion, for example, of a voltage output from the sensor.

The semiconductor integrated circuit preferably further includes a standard voltage circuit for receiving a power supply voltage from the battery and for outputting a constant standard voltage. The booster preferably uses, as the pre-boost voltage, the standard voltage output from the standard voltage circuit. Each of the sensor driver and the measuring circuit preferably uses, as a reference voltage, the standard voltage output from the standard voltage circuit.

Then, even when the electromotive force of the battery varies, the pre-boost voltage of the booster is a constant standard voltage. Since each of the sensor driver and the measuring circuit uses a constant standard voltage as a reference voltage, variations of environments for measuring the sensor are suppressed.

In the semiconductor integrated circuit, a current flowing from the standard voltage circuit to the booster is preferably limited during a period after the booster starts boosting and before the boosted voltage is stabilized.

Specifically, in actual operation of the booster, before the boosted voltage is stabilized, a current in an amount larger than that of an operating current including a sensor current flowing after stabilization of the boosted voltage flows so that the amount of current flowing from the battery increases. Therefore, if only a small amount of charge remains in the battery, a transient current greatly reduces the electromotive force of the battery and might cause reset for system stabilization. To obtain a stable boosted voltage, stabilizing capacity for the boosted voltage needs to be increased. When the stabilizing capacity is large, a transient current at the start of boosting has a great influence on a decrease of the electromotive force of the battery. In view of this, the function of limiting current flowing from the standard voltage circuit to the booster during a period after the start of boosting and before stabilization of the boosted voltage is provided to prevent an excessive current from flowing in boost operation. Accordingly, even in a case where only a small amount of charge remains in the battery and the stabilizing capacity is large, the system operates with stability without a great decrease of the electromotive force.

According to the present invention, in a sensor driving/measuring system, a battery having a high electromotive force is unnecessary even when a voltage applied to the sensor is high. This enables reduction of the number of batteries and replacement to batteries having low electromotive forces, thus reducing the cost. In addition, it is unnecessary to set the breakdown voltage of the semiconductor integrated circuit higher than necessary so that fabrication processes at reasonable cost are applicable, thus reducing the cost for the semiconductor integrated circuit alone. Further, no external parts for absorbing the influence of a high power supply voltage are needed, thus enabling cost reduction of the overall system.

Moreover, the system is allowed to operate with stability until the battery almost runs out.

Moreover, the reduction in the number of batteries reduces the size and weight of the sensor driving/measuring system.

BRIEF DESCRIPTION OF THE DRAWINGS

FIG. 2 shows the case of not employing a function according to the second embodiment.

FIG. 3 shows the case of employing the function according to the second embodiment.

DETAILED DESCRIPTION OF THE INVENTION

Hereinafter, embodiments of the present invention will be described with reference to the drawings.

Embodiment 1

Figure 1:
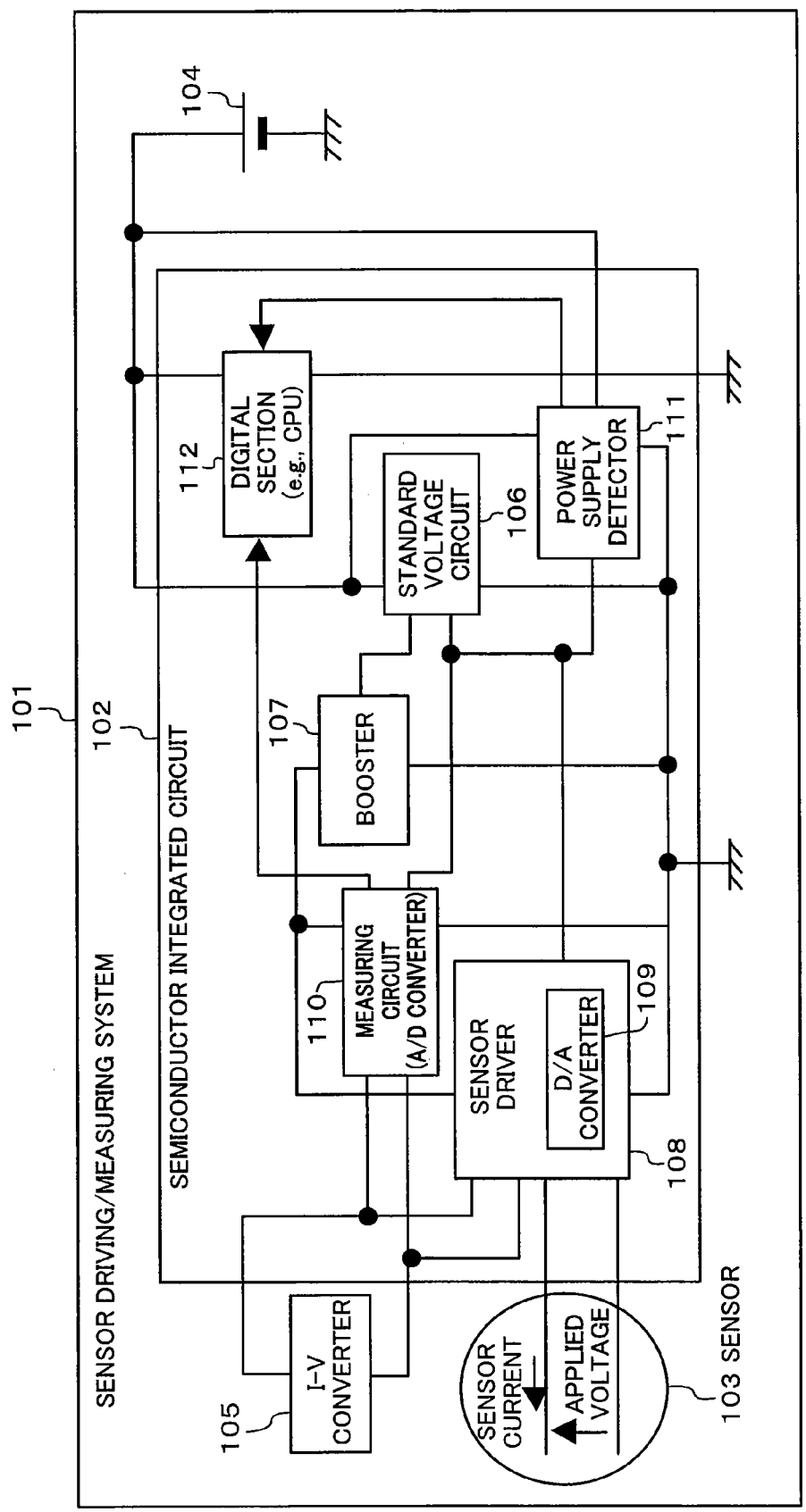
FIG. 1 is a block diagram illustrating a configuration of a sensor driving/measuring system according to first and second embodiments of the present invention.

FIG. 1 is a block diagram illustrating an overall configuration of a sensor driving/measuring system according to a first embodiment of the present invention. The sensor driving/measuring system 101 illustrated in FIG. 1 includes: a sensor 103 for generating current according to characteristics of a measurement target upon application of a given voltage; a sensor driving/measuring semiconductor integrated circuit 102 for driving and measuring the sensor 103; a battery 104 serving as a power supply; and a current-to-voltage (I-V) converter 105 for converting a current generated in the sensor 103 into a voltage.

The sensor driving/measuring semiconductor integrated circuit 102 includes: a sensor driver 108 for outputting a given voltage which is to be applied to the sensor 103; a measuring circuit (A/D converter) 110 for receiving an I-V converted signal from the sensor 103, i.e., a voltage obtained, through I-V conversion by the I-V converter 105, from a current generated in the sensor 103 and for measuring the voltage; and a booster 107 for operating the sensor driver 108 and the measuring circuit 110. The sensor driver 108 includes a D/A converter 109. The semiconductor integrated circuit 102 also includes a standard voltage circuit 106 for receiving a power supply voltage from the battery 104 and for outputting a constant standard voltage. The standard voltage circuit 106 outputs a constant standard voltage even when the electromotive force of the battery 104 varies. The booster 107 receives the standard voltage from the standard voltage circuit 106 as a pre-boost voltage (i.e., a voltage to be boosted), boosts the pre-boost voltage, and outputs the boosted voltage to the sensor driver 108 and the measuring circuit 110 as a power supply voltage. Each of the sensor driver 108 and the measuring circuit 110 uses, as a reference voltage, the standard voltage output from the standard voltage circuit 106.

The standard voltage circuit 106 prevents the boosted voltage of the booster 107 from varying even when the power supply voltage of the battery 104 varies, so that the operation states of the sensor driver 108 and the measuring circuit 110 are not affected. This enables characteristics of the sensor to be grasped with higher accuracy. The standard voltage circuit 106 may not be provided. In this case, it is sufficient to use an arbitrary voltage, e.g., the power supply voltage of the battery 104, as the pre-boost voltage of the booster 107.

In the configuration shown in FIG. 1, the semiconductor integrated circuit 102 includes: a digital section 112, such as a CPU, for processing an output signal from the measuring circuit 110 and for performing system control; and a power supply detector 111 for monitoring and managing the power supply voltage of the battery 104. This configuration needs a smaller number of parts incorporated in the sensor driving/measuring system 101, thereby reducing the cost. The digital section 112 and the power supply detector 111 may be provided separately from the semiconductor integrated circuit 102.

The I-V converter 105 may be incorporated in the semiconductor integrated circuit 102 as long as the required accuracy is permitted. Then, the number of parts of the sensor driving/measuring system 101 is reduced, thereby achieving cost reduction. In this embodiment, the I-V converter 105 measures a current flowing in an upper electrode of the sensor 103. Alternatively, the I-V converter 105 may convert a current flowing in a lower electrode of the sensor 103 into a voltage. In this case, a voltage range in which the A/D converter of the measuring circuit 110 is operable needs to be set at the lower electrode of the sensor driver 108. In either case, the overall power-supply-voltage range width is not affected.

The battery 104 may have a power supply voltage lower than an applied voltage required by the sensor 103, but needs to have an electromotive force equal to or higher than the lower limit of the voltage range in which the semiconductor integrated circuit 102 is operable.

The power supply voltage of the battery 104 is boosted by the booster 107 incorporated in the semiconductor integrated circuit 102. The measuring circuit 110 receives, from the booster 107, a high voltage at which an applied voltage required by the sensor 103 is allowed to be output. The sensor driver 108 makes the D/A converter 109 adjust the given voltage required by the sensor 103 and outputs the adjusted voltage. Upon application of a given voltage to the sensor 103, a current according to characteristics of a measurement target is generated. This current is converted into a voltage by the I-V converter 105. The voltage output from the I-V converter 105 serves as an input signal to the A/D converter in the measuring circuit 110. However, since the measuring circuit 110 operates at a boosted voltage higher than the voltage applied to the sensor 103, the measuring circuit 110 normally outputs an A/D conversion result.

As described above, in this embodiment, even when a voltage of the battery in the sensor driving/measuring system is low, a voltage required by the sensor is applied across both electrodes of the sensor, thereby correctly measuring a current generated in the sensor. In this case, the output voltage of the booster is the highest in the semiconductor integrated circuit. Therefore, fabrication processes with a breakdown voltage higher than necessary are not needed so that processes at reasonable cost such as ordinary CMOS fabrication processes are applicable in most cases.

Embodiment 2

A sensor driving/measuring system according to a second embodiment of the present invention has a configuration similar to that illustrated in FIG. 1. However, a semiconductor integrated circuit 102 according to this embodiment has the function of limiting a current flowing from a standard voltage circuit 106 to a booster 107 during a period after the booster 107 starts boosting and before the boosted voltage is stabilized.

Figure 2:
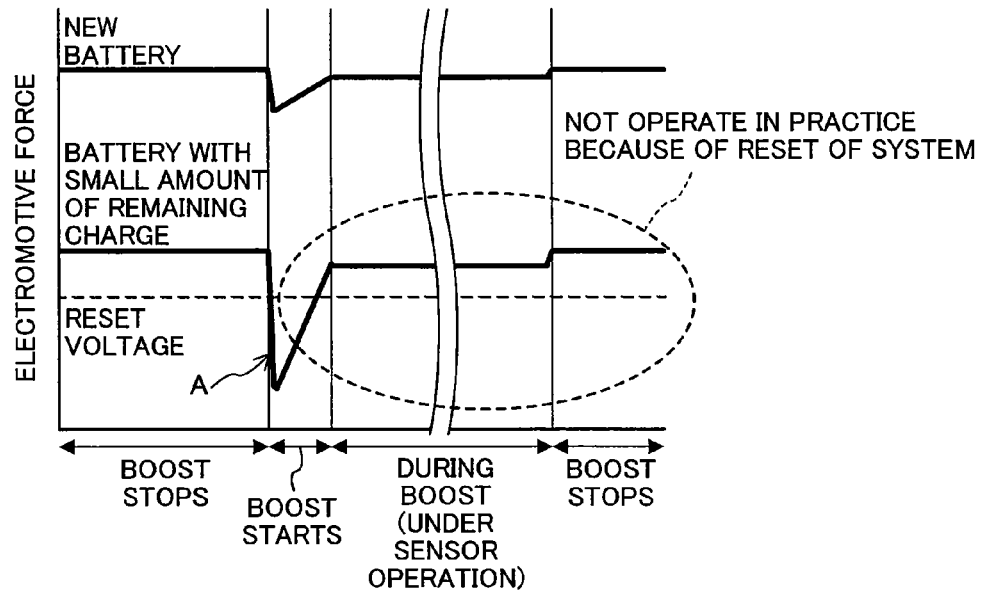
FIG. 2 is a graph showing changes of electromotive forces of batteries in boost operation.
Figure 3:
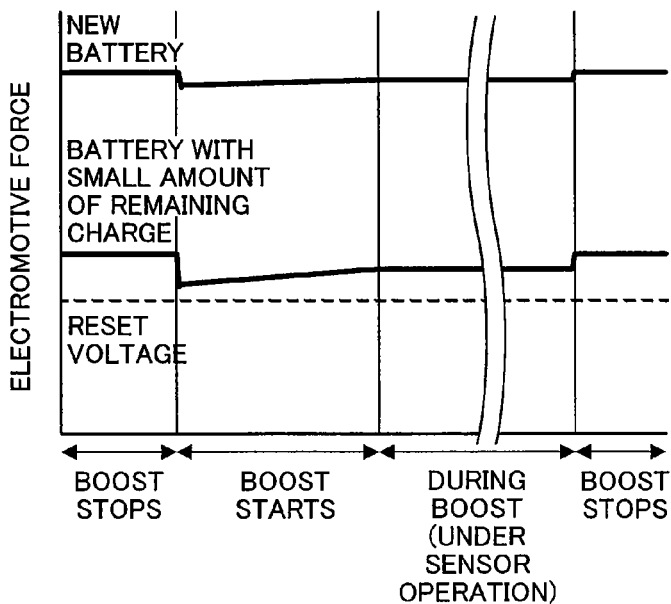
FIG. 3 is a graph showing changes of electromotive forces of batteries in boost operation.
Figure 4:
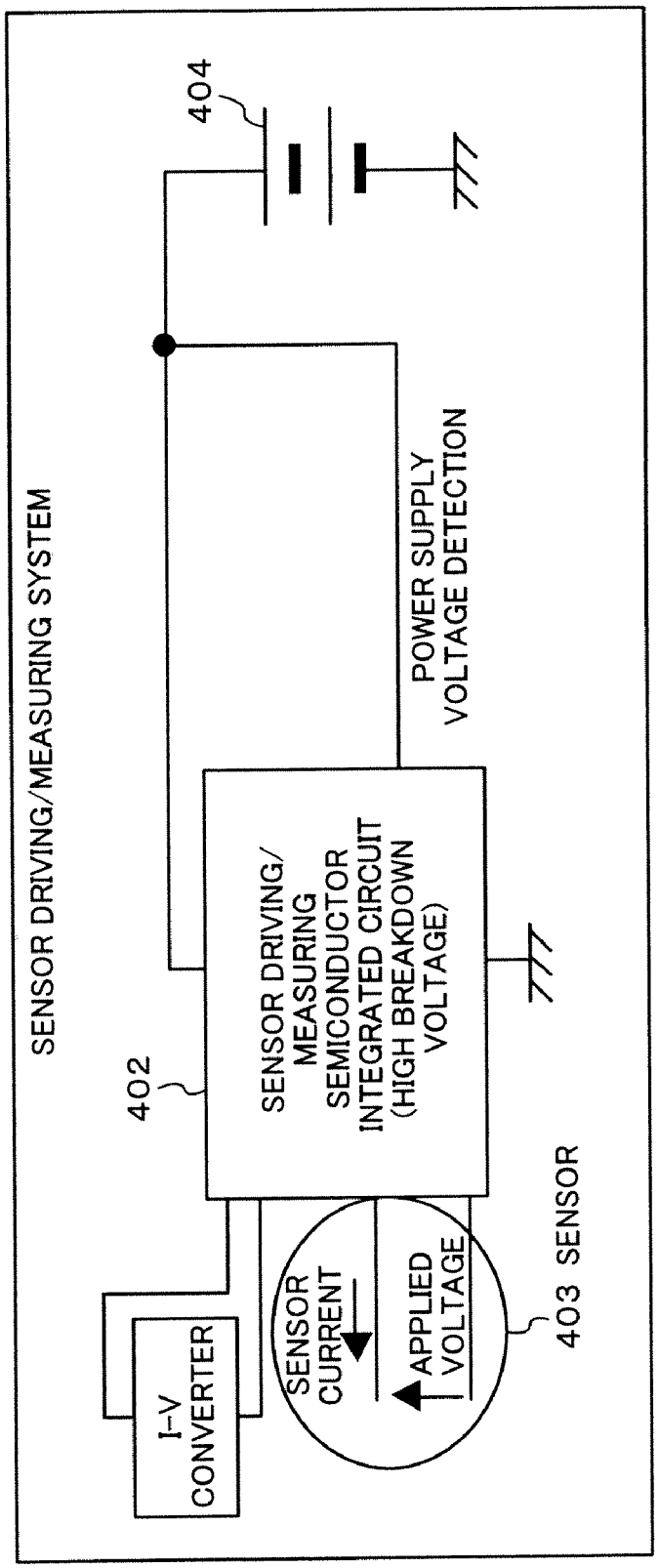
FIG. 4 is a block diagram showing a configuration of a conventional sensor driving/measuring system using a semiconductor integrated circuit having a high breakdown voltage.
Figure 5:
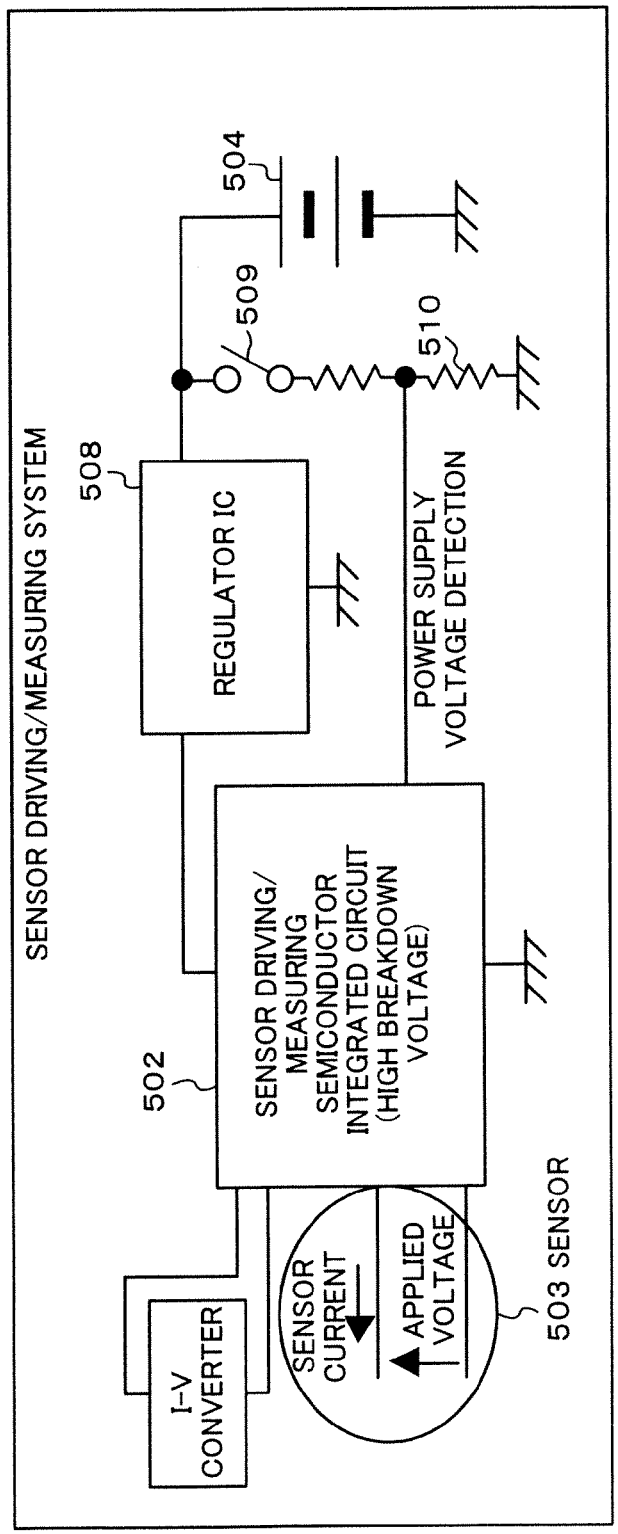
FIG. 5 is a block diagram showing a configuration of a conventional sensor driving/measuring system using a semiconductor integrated circuit fabricated with low-cost processes.

FIGS. 2 and 3 are graphs showing changes of electromotive forces of batteries in boost operation. Each of the graphs shows the case of using a new battery and the case of using a battery in which only a small amount of charge remains. In FIG. 2, the function according to this embodiment is not employed, whereas in FIG. 3 the function according to this embodiment is employed.

In FIG. 1, if the sensor driving/measuring system 101 operates the booster 107 to actually drive the sensor, it is necessary for the booster 107 to be supplied with a larger amount of current than that of an operating current including a sensor current until the boosted voltage output from the booster 107 rises to a boosted potential in a steady state. To obtain a stable boosted voltage in normal operation, it is necessary to increase the current-supply capacity of the standard voltage circuit 106 that generates a pre-boost voltage to be input to the booster 107 or to increase the stabilizing capacity of the booster 107 for outputting the boosted voltage. In either case, a large amount of current flows from the battery 104 into the booster 107 at the start of boosting.

If the battery 104 is new, the electromotive force is high and the internal resistance of the battery is low. On the other hand, when only a small amount of charge remains in the battery 104, the electromotive force is low and the internal resistance thereof is high. The electromotive force of the battery in boost operation changes as shown in FIG. 2. Specifically, in the case of a battery with a small amount of remaining charge, a large amount of current flows in the semiconductor integrated circuit 102 so that the electromotive force of the battery greatly decreases in a period after boost operation starts and before the boosted voltage rises to a steady state.

On the other hand, to operate the sensor driving/measuring system 101 with stability, it is necessary to install a mechanism for resetting the sensor driving/measuring system 101 at a power supply voltage higher than the lower limit of the voltage range in which a CPU for performing system control is operable. In general, the lower limit of the voltage range in which the CPU is operable is often lower than the electromotive force of a battery which is almost running out. Therefore, when the system is reset, the battery is almost running out in many cases.

However, if boost operation is performed with a small amount of charge remaining in the battery in the sensor driving/measuring system 101 of this embodiment, an excessive transient current flowing into the booster 107 reduces the electromotive force, so that the system is likely to be reset (see A in FIG. 2). This is equivalent to a rise of the lowest voltage for system operation. Accordingly, even a battery in which charge still remains cannot be used to operate the system, i.e., the battery life of the system is shortened. If boost operation is always performed after the start of boosting, no excessive current flows after start-up of the system and the system is less likely to be reset. However, this means that current consumption is always high in this case and, therefore, has the opposite effect to what was intended in terms of battery life of the system.

To eliminate such drawbacks, the current-supply capacity of a portion in which output is given from the standard voltage circuit 106 to the booster 107 is limited during a period after boosting starts and before the boosted voltage is stabilized. Specifically, for example, the sizes of transistors are switched. In this manner, as shown in FIG. 3, though the period after the start of boosting and before stabilization of the boosted voltage is extended, a transient decrease of the electromotive force of the battery is greatly suppressed so that the system is not reset even when a small amount of charge remains in the battery. This enables the booster 107 to operate and drive/measure the sensor until the electromotive force of the battery approaches the reset voltage, thereby extending the battery life of the system.

Accordingly, in this embodiment, the system operates with stability until the battery of the sensor driving/measuring system almost runs out, thus ensuring stability almost equal to that of conventional systems.

The present invention is useful for reducing the cost, size and weight of sensor driving/measuring systems.

What is claimed is:

1. A semiconductor integrated circuit for use in a sensor driving/measuring system driven by a battery, the semiconductor integrated circuit comprising:
    a sensor driver for outputting a given voltage to be applied to a sensor;
    a measuring circuit for receiving and measuring a voltage obtained, through current-voltage conversion, from a current generated in the sensor;
    a booster for boosting a given pre-boost voltage to obtain a boosted voltage and for supplying the boosted voltage as a power supply voltage to the sensor driver and the measuring circuit; and
    a standard voltage circuit for receiving a power supply voltage from the battery and for outputting a constant standard voltage,
    wherein the booster uses, as the given pre-boost voltage, the standard voltage output from the standard voltage circuit, and
    each of the sensor driver and the measuring circuit uses, as a reference voltage, the standard voltage output from the standard voltage circuit.

2. The semiconductor integrated circuit of claim 1, further comprising a current-voltage converter for converting a current generated in the sensor into a voltage.

3. The semiconductor integrated circuit of claim 1, wherein a current flowing from the standard voltage circuit to the booster is limited during a period after the booster starts boosting and before the boosted voltage is stabilized.

4. The semiconductor integrated circuit of claim 1, further comprising a digital section for processing an output signal from the measuring circuit.

5. The semiconductor integrated circuit of claim 1, further comprising a power supply detector for monitoring and managing a power supply voltage from the battery.

6. A battery-driven sensor driving/measuring system for driving and measuring a sensor, the system comprising at least one semiconductor integrated circuit, said at least one semiconductor integrated circuit comprising:
    a sensor driver for outputting a given voltage to be applied to the sensor;
    a measuring circuit for receiving and measuring a voltage obtained, through current-voltage conversion, from a current generated in the sensor;
    a booster for boosting a given pre-boost voltage to obtain a boosted voltage and for supplying the boosted voltage as a power supply voltage to the sensor driver and the measuring circuit; and
    a standard voltage circuit for receiving a power supply voltage from the battery and for outputting a constant standard voltage,
    wherein the booster uses, as the given pre-boost voltage, the standard voltage output from the standard voltage circuit, and
    each of the sensor driver and the measuring circuit uses, as a reference voltage, the standard voltage output from the standard voltage circuit.

* * * * *